(12) United States Patent
Makishima et al.

(10) Patent No.: US 7,773,142 B2
(45) Date of Patent: Aug. 10, 2010

(54) ELECTRONIC CAMERA WITH PRINT SPECIFYING INFORMATION

(75) Inventors: Sugio Makishima, Saitama-ken (JP); Hiroshi Tanaka, Saitama-ken (JP); Hisayoshi Tsubaki, Saitama-ken (JP); Mikio Watanabe, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 1024 days.

(21) Appl. No.: 10/730,117

(22) Filed: Dec. 9, 2003

(65) Prior Publication Data

US 2004/0080654 A1 Apr. 29, 2004

Related U.S. Application Data

(63) Continuation of application No. 09/219,123, filed on Dec. 23, 1998, now Pat. No. 6,686,964.

(30) Foreign Application Priority Data

Dec. 26, 1997 (JP) ................................... 9-358671

(51) Int. Cl.
*H04N 5/222* (2006.01)
*G03B 13/02* (2006.01)

(52) U.S. Cl. ........................ 348/333.02; 348/333.05; 348/333.11; 396/374

(58) Field of Classification Search ............ 348/333.02, 348/207.2, 333.01, 333.05, 207.99, 207.1, 348/207.11, 333.12, 552, 96–99; 396/1, 396/2, 373, 374
See application file for complete search history.

(56) References Cited

U.S. PATENT DOCUMENTS

| 4,571,627 | A | | 2/1986 | Stempeck .............. 348/333.09 |
|---|---|---|---|---|
| 5,343,386 | A | | 8/1994 | Barber ........................ 700/90 |
| 5,506,661 | A | * | 4/1996 | Hanzawa ...................... 399/1 |
| 5,587,740 | A | | 12/1996 | Brennan ...................... 707/10 |
| 5,710,954 | A | | 1/1998 | Inoue ..................... 348/333.1 |
| 5,737,491 | A | | 4/1998 | Allen et al. .............. 248/211.3 |
| 5,966,553 | A | * | 10/1999 | Nishitani et al. ............ 396/303 |
| 6,094,217 | A | | 7/2000 | Nishimura |
| 6,249,316 | B1 | | 6/2001 | Anderson ................ 348/333.5 |
| 6,334,025 | B1 | | 12/2001 | Yamagami |
| 6,522,354 | B1 | * | 2/2003 | Kawamura et al. ........ 348/231.2 |
| 6,686,964 | B1 | * | 2/2004 | Makishima et al. .... 348/333.02 |
| 2004/0201764 | A1 | * | 10/2004 | Honda et al. .......... 348/333.01 |

FOREIGN PATENT DOCUMENTS

| JP | 7-184160 A | 7/1995 |
|---|---|---|
| JP | 8-223526 A | 8/1996 |
| JP | 8-226311 A | 9/1996 |
| JP | 9-005870 | 1/1997 |
| JP | 9-322114 A | 12/1997 |

* cited by examiner

*Primary Examiner*—David L Ometz
*Assistant Examiner*—Richard M Bemben
(74) *Attorney, Agent, or Firm*—Birch, Stewart, Kolasch & Birch, LLP

(57) ABSTRACT

A digital camera capable of readily recognizing the printing-specifying information that has been set.

Printing-specifying information is set for digital image data acquired by photographing. When an image for which printing-specifying information has been set is displayed on a monitor provided in the digital camera, the image is displayed along with the set printing-specifying information.

7 Claims, 4 Drawing Sheets

ELECTRONIC CAMERA WITH PRINT SPECIFYING INFORMATION

This application is a continuation of application Ser. No. 09/219,123, filed on Dec. 23, 1998 and issued as U.S. Pat. No. 6,686,964 on Feb. 3, 2004, and for which priority is claimed under 35 U.S.C. §120; and this application claims priority of Application No. 9-358671 filed in Japan on Dec. 26, 1997 under 35 U.S.C. §119; the entire contents of all are hereby incorporated by reference.

BACKGROUND OF THE INVENTION

1. Field of the Invention

The present invention relates generally to digital cameras, and more particularly to a digital camera capable of setting printing-specifying information in printing digital image data acquired by photographing.

2. Description of the Related Art

In digital electronic cameras (hereinafter referred to as digital cameras), image data acquired by photographing is recorded as digital image data on a storage medium, such as internal memory or an integrated circuit (IC) card, provided inside the digital camera. Based on the recorded digital image data, the image acquired by photographing can be displayed on a monitor or printed with a printer. Some of the aforementioned digital cameras are known as digital cameras equipped with a liquid crystal monitor. In digital cameras thus equipped with a liquid crystal monitor, a photographed image can be immediately displayed on the liquid crystal monitor.

It is conceivable that a laboratory order function of setting the number of order sheets is mounted in a laboratory system for reproducing digital image data thus acquired with the digital camera, by printing that data. In this case, in the digital camera, printing-specifying information, such as the number of print sheets, a frame number, printing size (paper size), trimming, surface treatment or the like, is set. This information is recorded on a storage medium along with digital image data. In the laboratory system, the printing-specifying information is read out of the storage medium. In accordance with this printing-specifying information, the recorded digital image data can be printed. This is not limited to the laboratory system. Even in the case where users reproduce digital image data acquired with a digital camera by a printer, the printer can read out printing-specifying information from the storage medium and print the digital image data in accordance with this printing-specifying information.

However, if printing-specifying information consisting of a plurality of kinds is set to a plurality of digital image data, it will become difficult to know what printing-specifying information has been set and which digital image data the printing-specifying information has been set to and this will be considerably inconvenient for users.

SUMMARY OF THE INVENTION

The present invention has been made in view of the aforementioned circumstances. Accordingly, it is an object of the present invention to provide a digital camera that is capable of readily recognizing the printing-specifying information that has been set.

To achieve this end, there is provided a digital camera which comprises: display means for displaying digital image data as a photographed image, the digital image data being acquired by photographing; printing-specifying information setting means for setting printing-specifying information to the digital image data, the printing-specifying information being used during printing; and control means for displaying the digital image data for which the printing-specifying information was set onto the displaying means so that the printing-specifying information corresponds to the digital image data.

It is preferable that the printing-specifying information during printing include a number of print sheets, specification of an index image, printing size, surface treatment, presence of a white frame, trimming and/or attribute data such as photographed date. The printing-specifying information is not limited to the aforementioned laboratory system but can also be employed when users themselves reproduce digital image data with a printer.

The aforementioned control means may be means for displaying digital image data with the printing-specifying information and digital image data with no printing-specifying information so that they are discriminated from each other, when they are displayed on the display means. Also, the control means may be means for displaying only the printing-specifying data for which the printing-specifying information was set, in displaying the digital image data on the display means.

Furthermore, the aforementioned control means is means for displaying the digital image data for which the printing-specifying information was set onto the display means in display form corresponding to the printing-specifying information.

The "display form corresponding to the printing-specifying information" means that when printing size, surface treatment, presence of a white frame, trimming, attribute data, or an in index image is set as printing-specifying information, an image is displayed in correspondence to an actually printed state so that the setting of the printing-specifying information can be visually recognized.

The aforementioned control means may be means for displaying a total number of print sheets on the display means, when the printing-specifying information during printing includes a number of print sheets. In addition, when the digital camera is further equipped with upper-limit value setting means for setting an upper limit value of a total number of print sheets that is used during the printing, the control means may be means for displaying the remaining number of print sheets with respect to the upper limit value of the total number of print sheets onto the display means. In this case, it is preferable that the control means be equipped with alarm means for giving an alarm when the number of print sheets exceeds the upper limit value of the total number of print sheets.

The aforementioned control means may be means for displaying a number of print frames on the display means, when the printing-specifying information during printing includes the number of print sheets. Furthermore, the control means may be means for displaying a printing price value corresponding to the number of print sheets onto the display means, when the printing-specifying information during printing includes the number of print sheets. When a printing price is displayed, the digital camera is further equipped with upper-limit value setting means for setting an upper limit of the printing price. In this case it is preferable that the control means be equipped with alarm means for giving an alarm when the printing price exceeds the upper limit number of the printing price.

According to the digital camera of the present invention, the digital image data for which the printing-specifying information was set is displayed onto the displaying means so that the printing-specifying information corresponds to the digital image data. The digital image data with the printing-specifying information and the contents of the printing-specifying information can therefore be recognized with the display means.

According to the digital camera of the present invention, the digital image data for which the printing-specifying information was set and the digital image data for which printing-specifying information was not set are displayed so that they are discriminated from each other. In addition, only the printing-specifying data for which the printing-specifying information was set is displayed. In this way, it can be easily confirmed whether or not digital image data has printing-specifying information.

According to the digital camera of the present invention, digital image data for which printing-specifying information was set is displayed in display form corresponding to the printing-specifying information. As a result, the contents of the printing-specifying information of the displayed digital image data can be visually recognized.

According to the digital camera of the present invention, the total number of print sheets is displayed when printing-specifying information includes the number of print sheets. In this way, users are able to confirm the total number of print sheets and give a price estimation of the print sheets, etc.

According to the digital camera of the present invention, the upper limit value of the total number of print sheets is set. In this way, specification of the number of print sheets greater than a predetermined number of print sheets can be prevented. In this case, the remaining number of print sheets with respect to the upper limit value of the total number of print sheets is displayed. As a result, the remaining number of print sheets can be easily confirmed. Furthermore, when the number of print sheets exceeds the upper limit value of the total number of print sheets, an alarm sound is given, or an alarm display is performed on the display means. Thus, it can be easily confirmed that the number of print sheets has reached the upper limit value.

According to the digital camera of the present invention, the number of print frames is displayed. Users are therefore readily able to recognize the number of print frames that are printed.

According to the digital camera of the present invention, the printing price value corresponding to the number of print sheets is displayed. This means that users are easily able to recognize the present printing price. In this case, the upper limit of the printing price is set. When the printing price exceeds the upper limit number of the printing price, an alarm is given. In this way, it can be easily confirmed that the printing price has reached the upper limit value.

BRIEF DESCRIPTION OF THE DRAWINGS

The above and other objects and advantages will become apparent from the following detailed description when read in conjunction with the accompanying drawings wherein:

FIG. 6 is a diagram showing images displayed on the monitor of the digital camera in FIG. 1, the images being shown so that they correspond to printing-specifying information, such as surface treatment, the presence of a white frame, date, trimming and the like;

DETAILED DESCRIPTION OF THE PREFERRED EMBODIMENT

Figure 1:
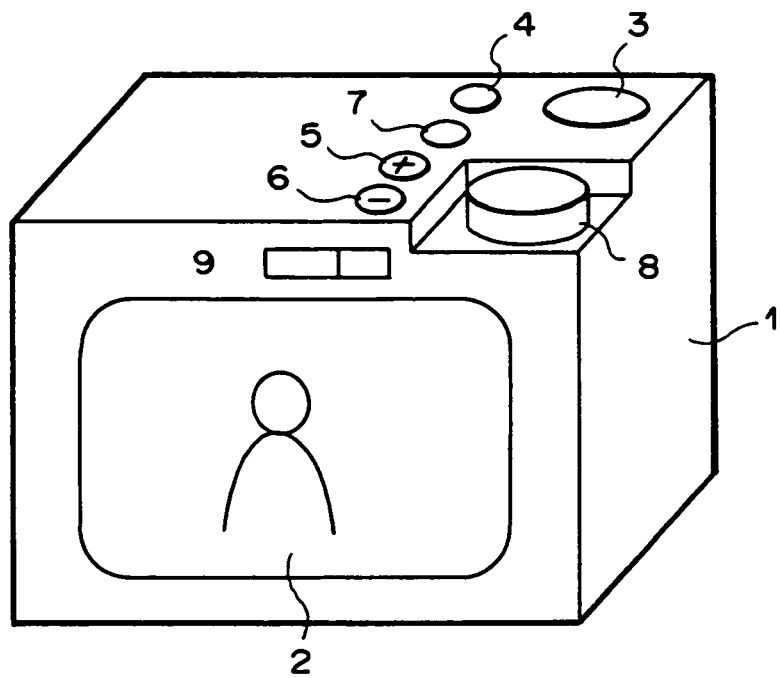
FIG. 1 is a perspective view showing the rear side of a digital camera according to an embodiment of the present invention.

Referring to FIG. 1, there is shown a digital camera according to an embodiment of the present invention. The digital camera is equipped with a camera main body 1, a liquid crystal monitor (hereinafter referred to as simply a monitor) 2 provided on the rear surface of the camera main body 1, and a release button 3 for performing photographing, a display on/off button 4 for turning on and off a display of characters on the monitor 2, and increment and decrement buttons 5 and 6 for switching an image displayed on the monitor 2 or changing the number of order sheets, as will be described later. The digital camera is further equipped with an execution button 7 for executing various processes, a mode setting dial 8 for setting the mode of the digital camera, such as a camera mode, a reproducing mode, an erasing mode or the like, and a power switch 9 for turning on or off a power supply for the digital camera.

The camera mode that is set by the mode setting dial 8 is a mode which stores image data acquired by photographing in a memory card to be described later. The reproducing mode is a mode which reproduces and displays the image data recorded on the memory card onto the monitor 2. The erasing mode is a mode which erases unnecessary image data recorded on the memory card provided within the camera main body 1, or performs formatting of the memory card.

For the digital image data acquired by photographing, printing-specifying information during printing, such as the number of print sheets, specification of an index image, printing size, surface treatment, presence of a white frame, trimming information and/or attribute data, is set by operating the release button 3, the increment button 5, the decrement button 6, the execution button 7, and the mode setting dial 8. This printing-specifying information is displayed on the monitor 2 so that it corresponds to a photographed image.

Here, the number of print sheets represents the number of print sheets during printing with respect to the frame. The printing size represents the size of paper to be printed. The surface treatment represents the surface treatment of paper to be printed, such as a gloss, silk reticulate, and the like. The white frame represents whether or not a white frame is added to paper to be printed and the trimming information represents whether or not an image to be printed is trimmed. The attribute data represents whether or not the date on which an image was photographed is printed, or the like.

By displaying a photographed image on the monitor 2 and setting the printing-specifying information, the image for which the printing-specifying information was set is displayed on the monitor 2 along with that printing-specifying information.

Figure 2:
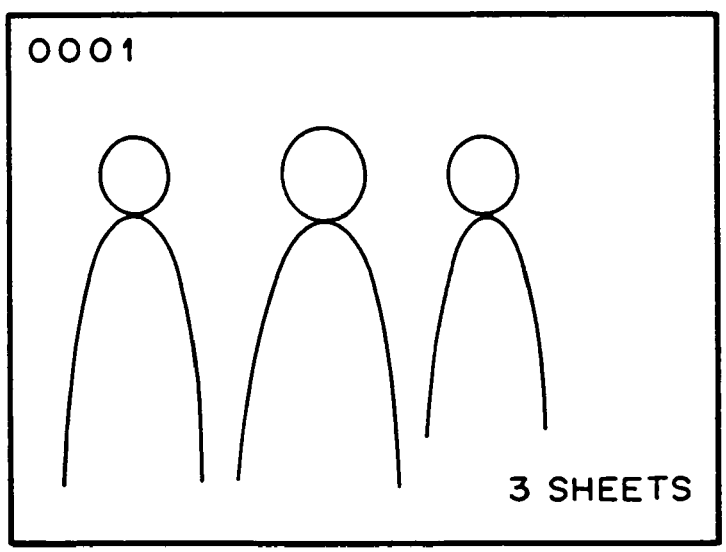
FIG. 2 is a diagram showing an image displayed on the monitor of the digital camera in FIG. 1, the number of print sheets also being shown.

FIGS. 2 through 8 illustrate the states in which an image for which the printing-specifying information was set has been displayed on the monitor 2, respectively. As illustrated in FIG. 2, when the number of print sheets is set to 3 sheets for an image on frame number 1, the image on the frame number 1 is displayed on the monitor 2 along with the information representing the number of print sheets, i.e., 3 sheets.

Figure 3:
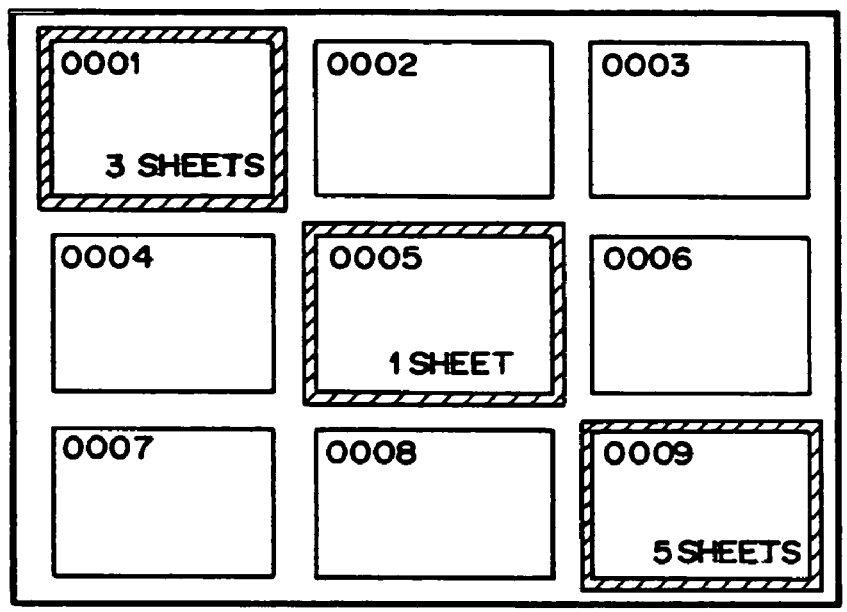
FIG. 3 is a diagram showing images displayed on the monitor of the digital camera in FIG. 1, images for which printing-specifying information was set and images for which printing-specifying information was not set being shown so that they can be discriminated from one another.

When a plurality of images acquired by photographing are scaled down and displayed on the monitor 2, as shown in FIG. 3, it is preferable that images with no printing-specifying information and images with printing-specifying information be discriminated from one another, by putting frames only on the images having printing-specifying information (frame Nos. 1, 5, and 9), for example. Furthermore, when images are displayed in order for each frame, only images for which printing-specifying information has been set may be displayed.

Figure 4:
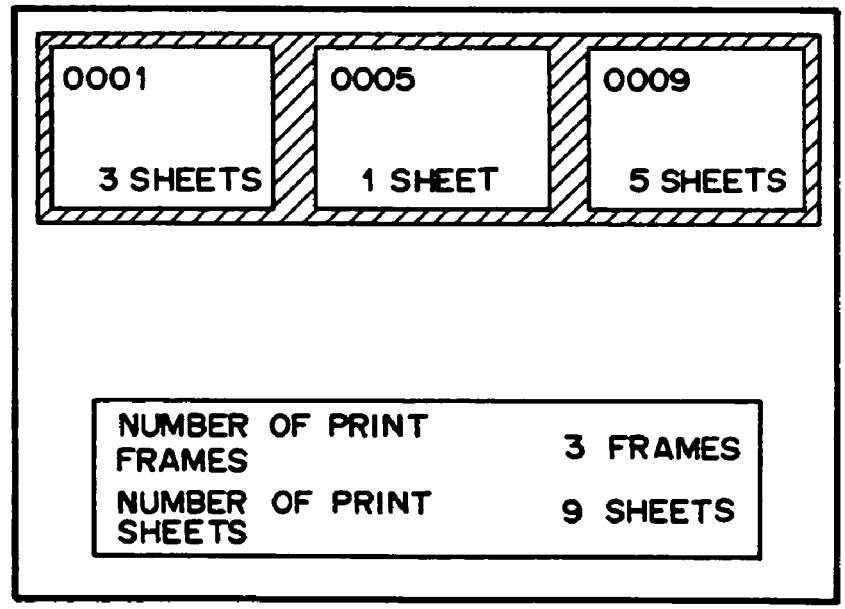
FIG. 4 is a diagram showing images displayed on the monitor of the digital camera in FIG. 1, only images for which printing-specifying information was set being shown.

As illustrated in FIG. 4, only images for which printing-specifying information has been set may be displayed on the monitor 2. In this case, the number of print frames and the total number of print sheets may be displayed on the space of the monitor 2 other than the portion on which images have been displayed.

Figure 5:
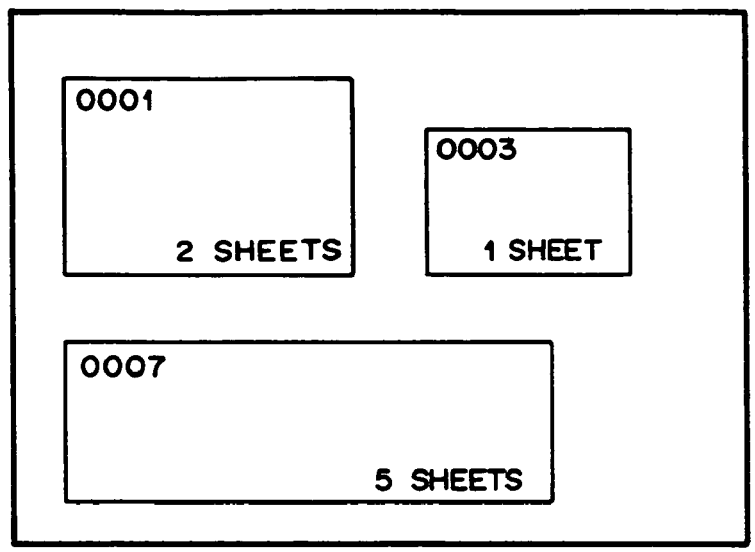
FIG. 5 is a diagram showing images displayed on the monitor of the digital camera in FIG. 1, the images being shown so as to correspond to their printing sizes.
Figure 6:
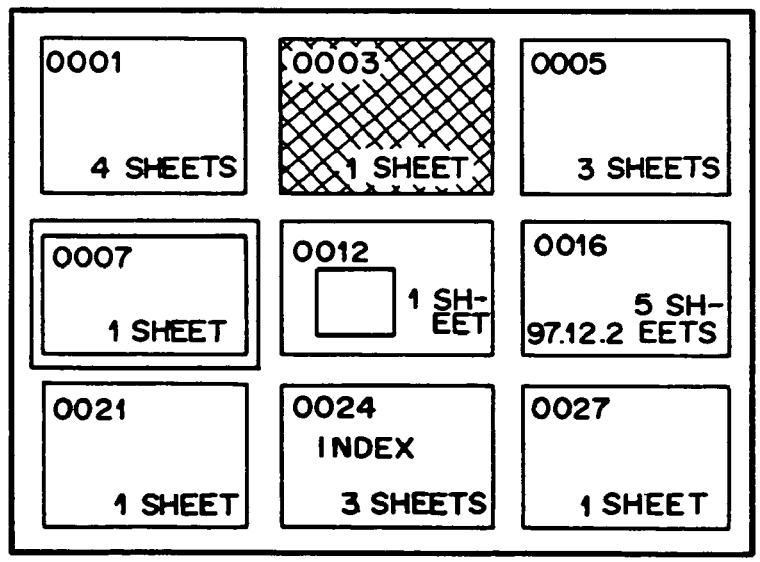

When printing size is set as the printing-specifying information, the image may be displayed in accordance with the printing size. For instance, when the image on the frame No. 1 is set to an enlarged size, the image on the frame No. 3 to a standard size, and the image on the frame No. 7 to a panoramic size, the display form is shown in FIG. 5. When images are displayed in order for each frame, the images may be displayed according to their printing sizes.

When surface treatment, such as gloss, silk reticulate and the like, the presence of a white frame, attribute data such as photographed date, and trimming are set as printing-specifying information, the image for which the printing-specifying information was set may be displayed so that it can be recognized that the printing-specifying information has been set. For example, when silk reticulate are specified as surface treatment for an image on frame No. 3, a white frame is specified for an image on frame No. 7, trimming is specified for an image on frame No. 12, and date is specified for an image on frame No. 16, the display form becomes a display form such as that shown in FIG. 6. In the figure, for the image on frame No. 3 a silk-reticulate pattern is displayed so as to represent that silk reticulate have been specified. For the image on frame No. 7, a white frame is displayed. For the image on frame No. 12, a trimmed region is displayed. For the image on frame No. 16, the date is displayed. Note that when trimming is specified, a trimmed region alone may be displayed on an enlarged scale.

Figure 7:
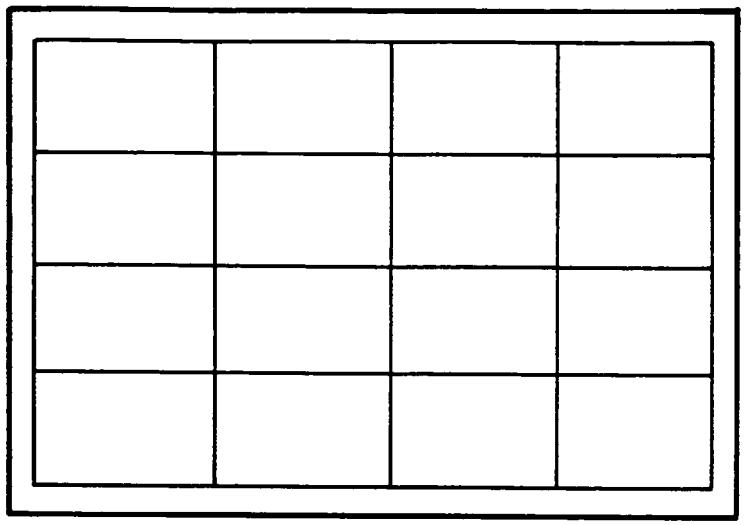
FIG. 7 is a diagram showing a plurality of index images displayed on the monitor of the digital camera in FIG. 1.

When an index image is set as printing-specifying information, an index image consisting of a plurality of images as shown in FIG. 7 is displayed on the monitor 2. In the case where an index image is displayed along with other images for which printing-specifying information has been set, if the index image consisting of a plurality of images is displayed as it is, the images constituting the index image become difficult to see because they are too small. For this reason, as in the image on frame No. 24 of FIG. 6, it is preferable that only a character display of "INDEX" representing that the image is an index image be performed.

Figure 8:
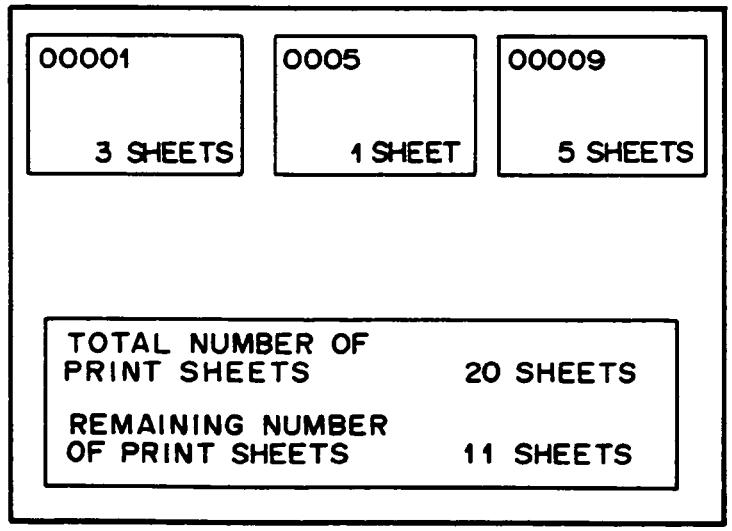
FIG. 8 is a diagram showing images displayed on the monitor of the digital camera in FIG. 1, the total number of print sheets and the remaining number of print sheets also being shown.

The digital camera of this embodiment may be provided with means for setting the upper limit value of the total number of print sheets in order to set the upper limit value of the total number of print sheets. In this case, the upper limit value of the total number of print sheets may be displayed as shown in FIG. 8 on the monitor 2, and along with this, the remaining number of print sheets with respect to this upper limit value may be displayed. Furthermore, when the number of print sheets exceeds the upper limit value, users may be informed by blinking the monitor 2 or an alarm sound that the remaining number of print sheets has gone to zero. Moreover, the printing price corresponding to the number of print sheets set for the digital camera of this embodiment may be displayed. In this case, the upper limit value of the printing price may be set, and when a printing price exceeds this upper limit value, an alarm may be given.

While the present invention has been described with reference to the preferred embodiment thereof, the invention is not limited to the details given herein, but may be modified within the scope of the appended claims.

What is claimed is:

1. A digital camera comprising:
   display means for displaying digital image data of a photographed image, the digital image data having been acquired by photographing and stored as fixed image data in a storage medium;
   printing-specifying information setting means for setting printing-specifying information for said digital image data, the printing-specifying information being used during printing; and
   control means for
   displaying said digital image data for which said printing-specifying information was set onto said display means so that said printing-specifying information corresponds to said digital image data and for
   displaying digital image data with no printing-specifying information onto said display means,
   such that said digital image data for which said printing-specifying information was set and said digital image data with no printing-specifying information are discriminated from each other when they are displayed at the same time on said display and if said printing-specifying information includes a number of print sheets, not only said set of printing-specifying information corresponding to each image data but also a set total number of print sheets to be printed is displayed at the same time on said display means prior to the digital image data being read out of the storage medium for printing;
   wherein said control means is means for displaying a printing price value corresponding to the number of print sheets onto said display means, when said printing-specifying information being used during printing includes a number of print sheets.

2. The digital camera as set forth in claim 1, wherein said printing-specifying information being used during printing includes a number of print sheets, specification of an index image, printing size, surface treatment, presence of a white frame, trimming and/or attribute data.

3. The digital camera as set forth in claim 1 or 2, wherein said control means is means for displaying only the printing-specifying data for which said printing-specifying information was set, in displaying said digital image data onto said display means.

4. The digital camera as set forth in claim 1, wherein said control means is means for displaying a number of print frames onto said display means, when said printing-specifying information being used during printing includes a number of print sheets.

5. A method to operate a digital camera, comprising the steps of:

setting printing-specifying information, to be used during printing, for a digital image;

displaying said digital image for which said printing-specifying information was set so that said printing-specifying information corresponds to said digital image on a display of said digital camera and further displaying a digital image acquired by photographing and stored as a fixed image without printing-specifying information, on a display of said digital camera, such that digital image data for which said printing-specifying information was set and digital image data without printing-specifying information are discriminated from each other when they are displayed at the same time on said display and if said printing-specifying information includes a number of print sheets, not only said set of printing-specifying information corresponding to each image data but also a set total number of print sheets to be printed is displayed at the same time on said display means prior to the digital image being read out of the digital camera for printing and further displaying a printing price value corresponding to the number of print sheets onto said display, when said printing-specifying information being used during printing includes a number of print sheets.

6. The method according to claim 5, wherein said printing-specifying information to be used during printing includes at least one of a number of print sheets, specification of an index image, a printing size, a surface treatment, a presence of a white frame, attribute data, and a print price.

7. The method according to claim 5, wherein displaying said digital image data for which said printing-specifying information was set, further comprises displaying at least one of the following:
   a sum of print sheets;
   a sum of digital image frames displayed; and
   a price corresponding said print sheets.

* * * * *